US010605954B2

(12) United States Patent
Hu et al.

(10) Patent No.: US 10,605,954 B2
(45) Date of Patent: Mar. 31, 2020

(54) SIMULTANEOUS EVALUATION OF THE VOLUME AND THE POSITION OF VOIDS IN DOWNHOLE CEMENT

(71) Applicant: Halliburton Energy Services, Inc., Houston, TX (US)

(72) Inventors: Yike Hu, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/517,947

(22) PCT Filed: Nov. 16, 2016

(86) PCT No.: PCT/US2016/062233
§ 371 (c)(1),
(2) Date: Apr. 7, 2017

(87) PCT Pub. No.: WO2017/116575
PCT Pub. Date: Jul. 6, 2017

(65) Prior Publication Data
US 2018/0267200 A1    Sep. 20, 2018

Related U.S. Application Data

(60) Provisional application No. 62/272,164, filed on Dec. 29, 2015.

(51) Int. Cl.
E21B 47/005    (2012.01)
G01V 5/12      (2006.01)
E21B 47/00     (2012.01)

(52) U.S. Cl.
CPC ............ *G01V 5/12* (2013.01); *E21B 47/0005* (2013.01)

(58) Field of Classification Search
CPC ........................... G01V 5/12; E21B 47/0005
See application file for complete search history.

(56) References Cited

U.S. PATENT DOCUMENTS

2012/0075953 A1    3/2012  Chace et al.
2013/0345983 A1    12/2013 Guo
(Continued)

FOREIGN PATENT DOCUMENTS

WO    2015/050661 A1    4/2015
WO    2017/030578 A1    2/2017
WO    2017/030579 A1    2/2017

OTHER PUBLICATIONS

International Search Report and Written Opinion for PCT/US2016/062233, dated Mar. 3, 2017.
(Continued)

*Primary Examiner* — David P Porta
*Assistant Examiner* — Shun Lee
(74) *Attorney, Agent, or Firm* — Benjamin Fite; C. Tumey Law Group PLLC

(57) ABSTRACT

A method may comprise providing a wellbore penetrating a subterranean formation, the wellbore being lined with a pipe and having a cement between the pipe and the wellbore, wherein the cement contains a defect; providing a control spectrum of gamma radiation count rates as a function of energy for a control, wherein the control comprises the cement without the defect; emitting gamma rays into the pipe and the cement having the defect from a source of a nuclear tool disposed in the wellbore; detecting count rates of gamma radiation scattered back from the pipe and the cement having the defect with a detector of the nuclear tool as a function of energy to produce a sample spectrum; and deriving one or more physical attributes related to the defect based on a comparison of the sample spectrum and the control spectrum.

20 Claims, 6 Drawing Sheets

(56) References Cited

U.S. PATENT DOCUMENTS

| | | |
|---|---|---|
| 2014/0052376 A1 | 2/2014 | Guo et al. |
| 2014/0291500 A1 | 10/2014 | Smaardyk et al. |
| 2015/0331141 A1* | 11/2015 | Grau .................. G01V 5/101 702/8 |
| 2017/0199298 A1* | 7/2017 | Hu ........................ G01V 5/12 |
| 2018/0195378 A1* | 7/2018 | Hu ........................ G01V 5/12 |
| 2018/0245451 A1* | 8/2018 | Hu ..................... E21B 47/0005 |

OTHER PUBLICATIONS

European Search Report for EP Application No. 16882246.8 dated Dec. 11, 2019.
Hu, Yike. et al., "Behind-Casing Cement Void Volumetric Evaluation", SPE Thermal Well Integrity and Design Symposium, Canada, Nov. 23-25, 2015, pp. 1-12.

* cited by examiner

SIMULTANEOUS EVALUATION OF THE VOLUME AND THE POSITION OF VOIDS IN DOWNHOLE CEMENT

BACKGROUND

The present application relates to assessing the integrity of a downhole cement.

Subterranean formation operations (e.g., stimulation operations, sand control operations, completion operations, etc.) often involve drilling a wellbore in a subterranean formation with a drilling fluid (and thereafter placing a cement column between the formation and a casing (or liner string) in the wellbore. The cement column is formed by pumping a cement slurry through the bottom of the casing and out through an annulus between the outer casing wall and the formation face of the wellbore, or by directly pumping a cement slurry into the annulus. The cement slurry then cures in the annular space, thereby forming a column of hardened cement that, inter alia, supports and positions the casing in the wellbore and bonds the exterior surface of the casing to the subterranean formation. This process is referred to as "primary cementing."

Among other things, the cement column may keep fresh water reservoirs from becoming contaminated with produced fluids from within the wellbore. As used herein, the term "fluid" refers to liquid phase fluids and gas phase fluids. The cement column may also prevent unstable formations from caving in, thereby reducing the chance of a casing collapse and/or stuck drill pipe. Finally, the cement column forms a solid barrier to prevent fluid loss or contamination of production zones. The degree of success of a subterranean formation operation involving placement of a cement column, therefore, depends, at least in part, upon the successful cementing of the wellbore casing and the cement's ability to maintain zonal isolation of the wellbore.

Failure of zonal isolation, among other things, may result in environmental contamination, which may cause harm to both flora and fauna, including humans. Such failure may further prevent production or reduce the production capability of a wellbore, which may result in abandonment. These issues may become exacerbated over time, where an understanding of the state of the cement column at an earlier point in time (e.g., the physical attributes of defects in the cement) may allow remedial actions to be performed and abandonment avoided.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to assessing the integrity of a downhole cement (e.g., the cement in the casing annulus of an oil and gas wellbore), and more specifically, assessing the physical attributes of defects in the cement using gamma radiation. For example, the volume and radial position of defects like voids in the downhole cement. Exemplary defects that may be present in a cement may include, but not limited to voids, channels, or cracks inside the cement sheath.

The voids that may be empty, at least partially filled with gas (e.g., carbon dioxide for injection wells or formation gases), at least partially filled with liquid (e.g., drilling mud or formation fluids), or at least partially filled with gas and liquid.

Embodiments of the present application analyze gamma ray spectra to assess the integrity of a cement by deriving one or more physical attributes of defects in the cement. Exemplary physical attributes may include, but are not limited to, the volume of the defect (e.g., the volume of a void or the percentage of porosity), the radial position of the defect relative to the wellbore and/or a pipe therein.

Figure 1:
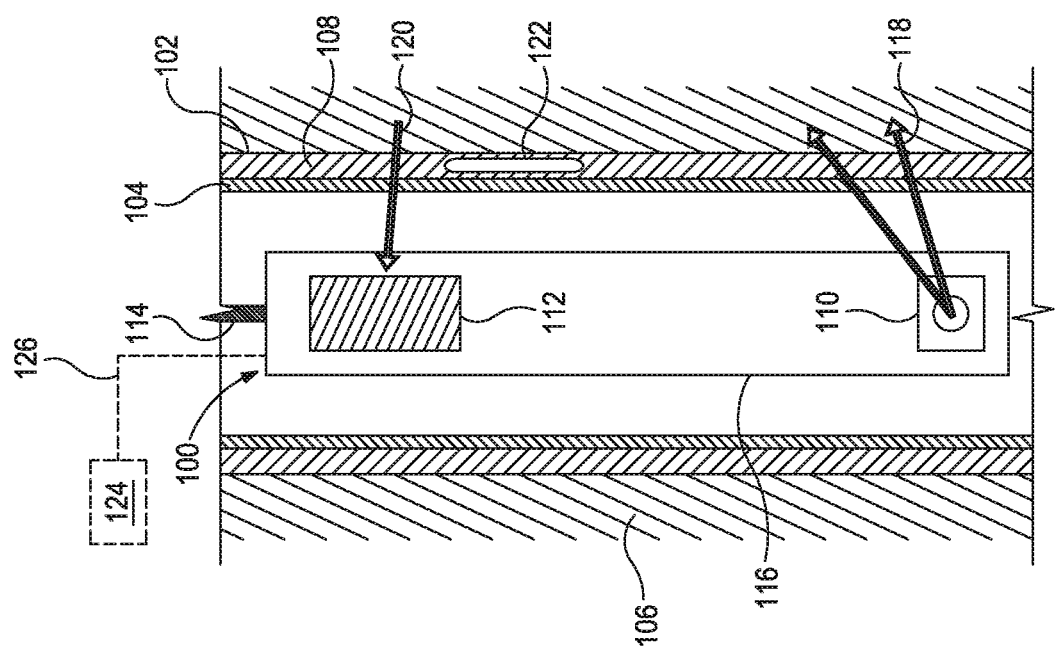
FIG. 1 illustrates side view of a nuclear tool disposed in a portion of a wellbore lined with a pipe and penetrating a subterranean formation.

For example, FIG. 1 illustrates side view of a nuclear tool 100 disposed in a portion of a wellbore 102 lined with a pipe 104 (e.g., a casing) and penetrating a subterranean formation 106. Disposed between the pipe 104 and the wellbore 102 is cement 108 having a defect therein, illustrated as a void 122. While illustrated as a single pipe 104, in some instances, multiple pipes 104 may be lining the wellbore 102 with cement 108 therebetween, one or more of which may have a void 122 therein. As used therein, defining the cement 108 having a void 122 therein to be disposed between the pipe 104 and the subterranean formation 106 does not mean that the pipe 104 and the subterranean formation 106 are necessarily the boundaries that contain the material 108. Rather, the cement 108 having the void 122 therein is radially, relative to the wellbore 102, located between the pipe 104 and the subterranean formation 106. For example, the cement 108 having the void 122 therein may be contained by two pipes that themselves are disposed between the pipe 104 and the subterranean formation 106. In another example, the cement 108 having the void 122 therein may be contained by the pipe 104 and a second pipe such that the second pipe is disposed between the pipe 104 and the subterranean formation 106.

The methods and systems described in more detail herein use the nuclear tool 100 to determine a volume and position of the void 122 in the cement 108.

The illustrated nuclear tool 100 includes a housing 116 that contains a source 110 and a detector 112. While the illustrated nuclear tool 100 includes one source 110 and one detector 112, in alternate embodiments, a nuclear tool may include more than one source and more than one detector.

The nuclear tool 100 is coupled to a conveyance 114 that may be used for moving the nuclear tool 100 along the wellbore 102, providing power to the nuclear tool 100, communicating information (e.g., data collected and operational commands), and the like, and any combination thereof. Exemplary conveyances may include, but are not limited to, a wireline, a coiled tubing, a slickline, a cable, drill pipe (e.g., as part of a logging-while-drilling or measuring-while-drilling tool), a downhole tractor, and the like. The nuclear tool in FIG. 1 is positioned in the center of the wellbore. In other embodiments, the nuclear tool could be pressed against the wellbore wall or casing by an external support.

The source 110 (e.g., a $^{137}$Cs source) emits gamma rays 118 into the pipe 104, the cement 108, and the formation 106. Gamma radiation 120 scattered back from the pipe 104, the cement 108, and the formation 106 is detected by the detector 112. Detection of the gamma radiation 120 may be by way of measuring a count rate of photons as a function of energy, which is referred to herein as a spectrum.

Further, the nuclear tool 100 may be communicably coupled 126 (wired or wirelessly) to a controller 124. The controller may communicate information to and/or from the nuclear tool 100. For example, the controller 124 may receive data (e.g., count rates) from the nuclear tool 100. In another example, the controller 124 may communicate instructions to the nuclear tool 100 regarding operation of the nuclear tool 100 (e.g., when to take measurements and the intensity of the gamma rays 118). Further, the controller 124 may perform the analyses and derivations described herein for assessing the integrity of the cement and the physical attributes of defects in the cement. Combinations of the foregoing may also be implemented.

To derive the volume and the position or other physical attributes of the void within the cement, a spectrum obtained from a cement with unknown integrity (e.g., having a void or other defect therein) is compared to a spectrum obtained from a standard cement (e.g., a cement with no void). Generally, the composition and surroundings (i.e., the pipe(s), the formation, and any cement between additional pipes) for the control and sample cements should be substantially the same. That is, the number, ordering, and composition of layers (except for the defect) should be the substantially the same when measuring the two spectra.

Figure 2:
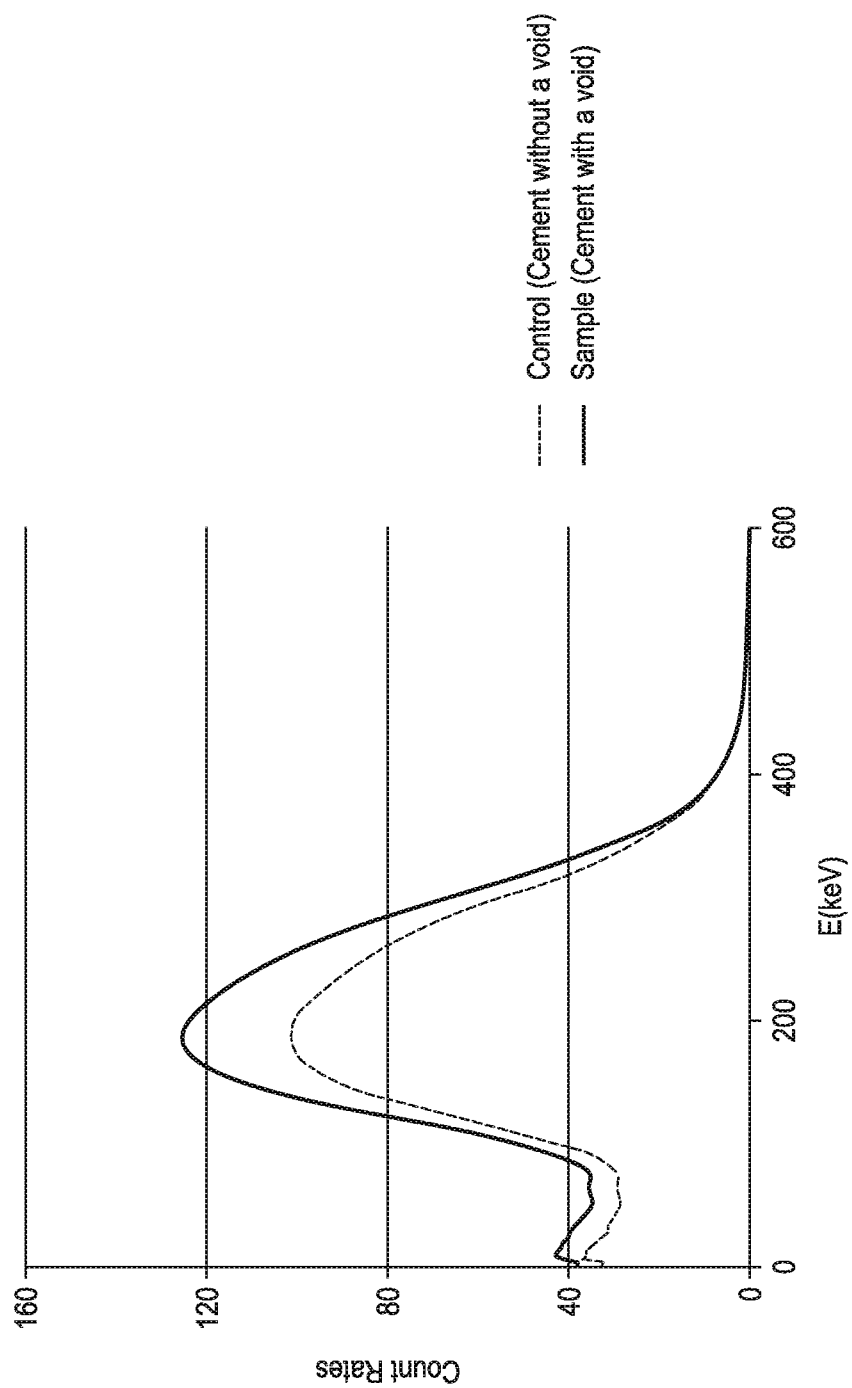
FIG. 2 is the spectra for (1) a cement without a void and (2) a cement with a void.

FIG. 2 is the spectra for (1) a cement without a defect (referred to herein as the "control") and (2) a cement with a defect, which is a void in this nonlimiting example (referred to herein as the "sample"), which was achieved with a Monte-Carlo N-particle simulation. These two plots may be analyzed and compared to derive the physical attributes of the spectra. More specifically, a count rate ratio and a dipping point, both detailed below, may be used to ascertain the volume and the position of the void.

First, the count rate ratio is related to the sum of count rates at an intermediate-energy range along the spectrum (e.g., 100 keV (kilo electron volt) to 300 keV and any subset thereof). The count rate ratio ($CR_{ratio}$) may be defined as the ratio between a sample spectrum count rate ($CR_{sam}$) and a control spectrum count rate ($CR_{con}$) at the selected intermediate-energy range (IER) (e.g., about 150 key to about 250 key), which, for example, may be expressed mathematically by Equation 1.

$$CR_{ratio} = \frac{CR_{sam}}{CR_{con}}\bigg|_{IER} \quad \text{Equation 1}$$

Figure 3:
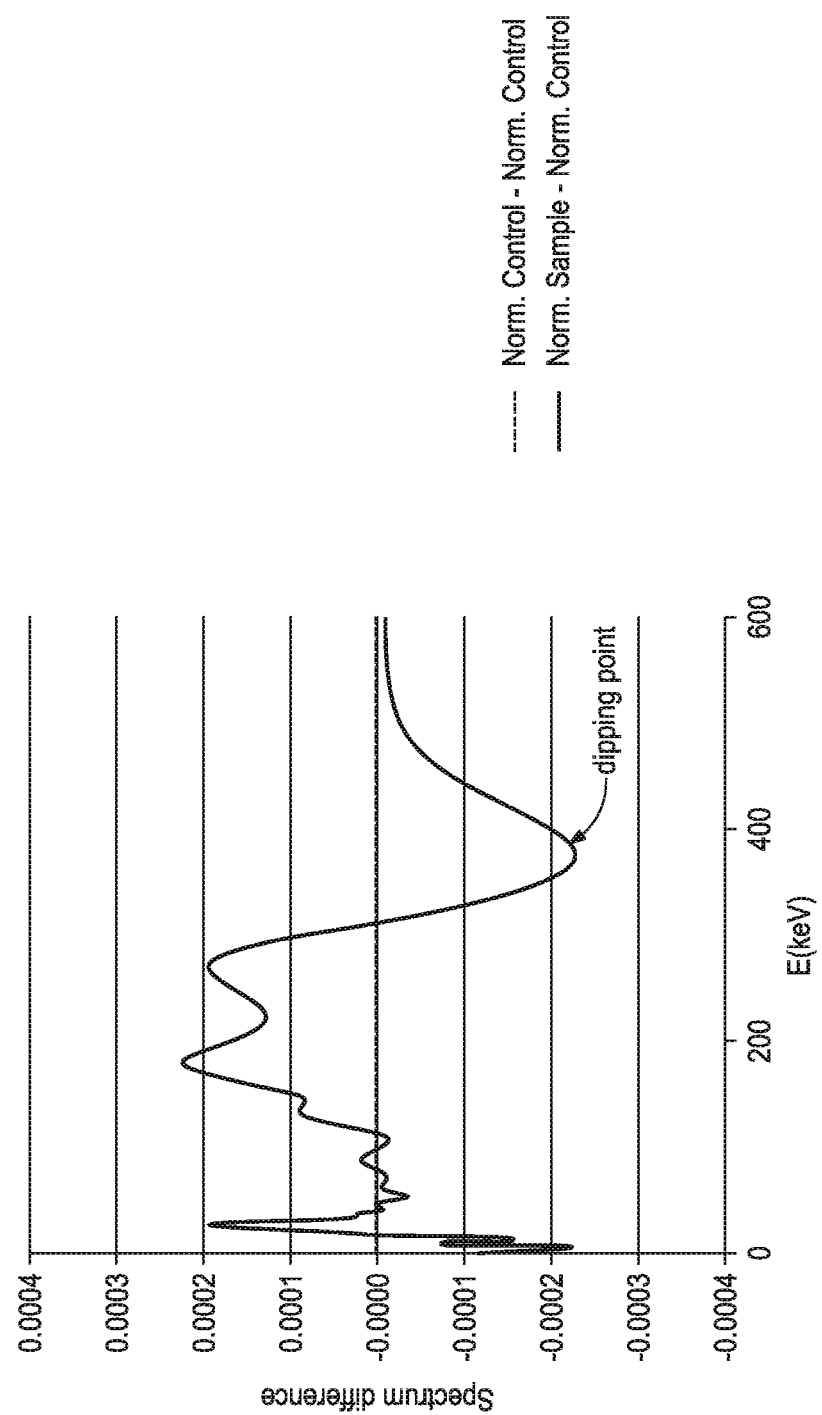
FIG. 3 is a plot of the normalized sample spectrum minus the normalized control spectrum used for determining a dipping point in a high-energy range.

Second, the dipping point is related to the differences between the sample and control spectra within a high-energy range (e.g., about 300 key to about 500 key). More specifically, the dipping point is the energy value corresponding to the spectrum shape change within a high-energy range. The sample spectrum and corresponding control spectrum (or equivalent derivatives thereof) may first be normalized. For example, each spectrum may be normalized so that the total count rates for each spectrum is 1. Then, the normalized control spectrum may be subtracted from the normalized sample spectrum. Continuing with the earlier example, the spectra illustrated in FIG. 2 once normalized and subtracted provide FIG. 3, which reveals the differences in the two spectra in the high-energy range. The "dipping point," labelled in FIG. 3, refers to the energy value corresponding to the minimum point in the normalized spectrum difference (i.e., normalized sample spectrum minus the normalized control spectrum) within the high-energy range. The dipping point may alternatively be determined using first derivatives of the normalized sample and control spectra, where once subtracted the dipping point is defined as the energy value corresponding to where the first derivative spectrum difference is zero when transitioning from negative to positive.

While this example specifically uses the normalized sample spectrum minus the normalized control spectrum (or derivatives thereof), the dipping point may be determined by other mathematical manipulations that compare the normalized sample spectrum to the normalized control spectrum to ascertain the differences in the high-energy range and, more specifically, the shape change in the high-energy range. For example, the normalized control spectrum minus the normalized sample spectrum (or derivatives thereof) may be used. Alternatively, a ratio of the two normalized spectra (or derivatives thereof) may be used.

Additionally, while the spectrum was normalized in this example, the dipping point could be determined by mathematical manipulations that compare the sample spectrum to the control spectrum to ascertain the difference in the high energy range and, more specifically, the shape change in the high energy range.

Further, the illustrated high and intermediate-energy ranges are not limiting. Methods and analyses described herein may involve determining the high and intermediate-energy ranges. Generally, the intermediate-energy range is non-overlapping with the high-energy range and at a lower energy than the high-energy range. The high-energy range may be adjusted (e.g., 250 key to 600 key and any subset thereof) so that the lower limit of the high-energy range is preferable at a higher energy than the peak energy of the original spectra. The intermediate-energy range may be adjusted (e.g., 75 key to 300 key and any, subset thereof) so that the intermediate-energy range preferably encompasses the peak energy of the spectra. The starting and ending values for each of the intermediate- and high-energy ranges are tool type specific and can be determined using computer simulation or lab experiments.

Figure 4:
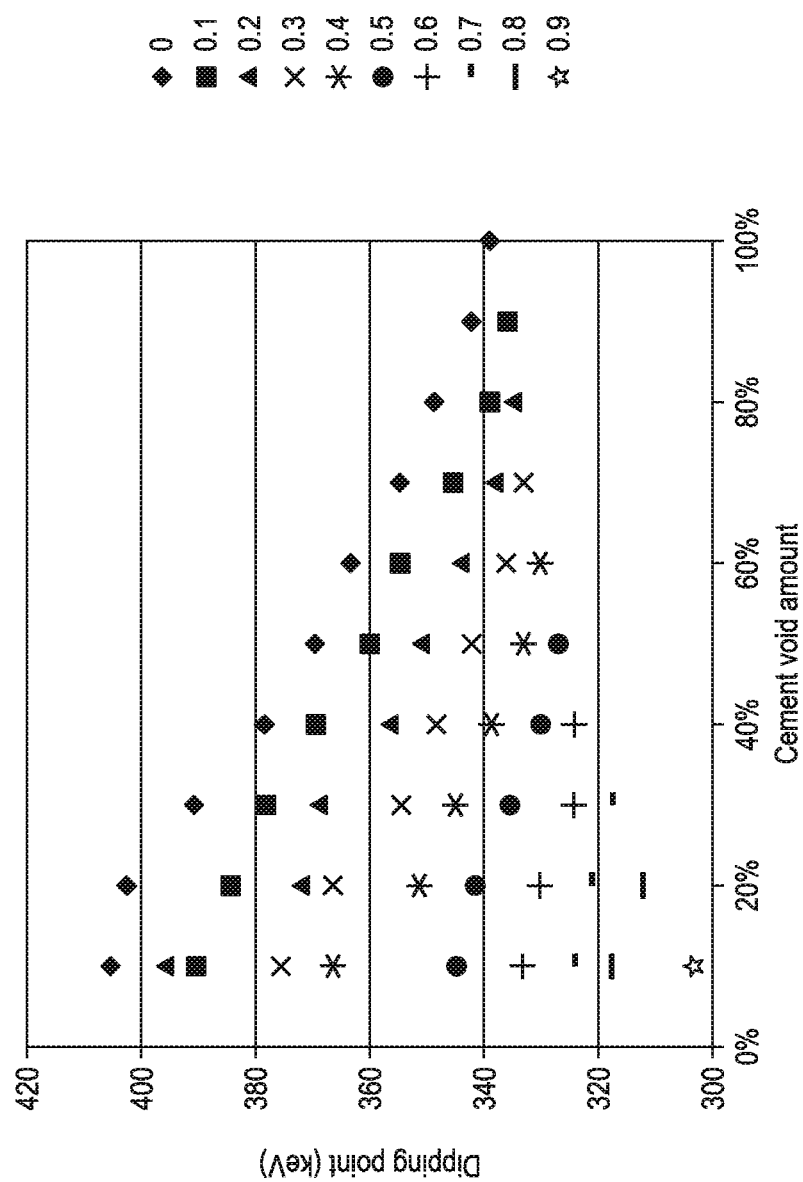
FIG. 4 is a plot of the dipping point values for a full set of basis structures of different cement integrities.
Figure 5:
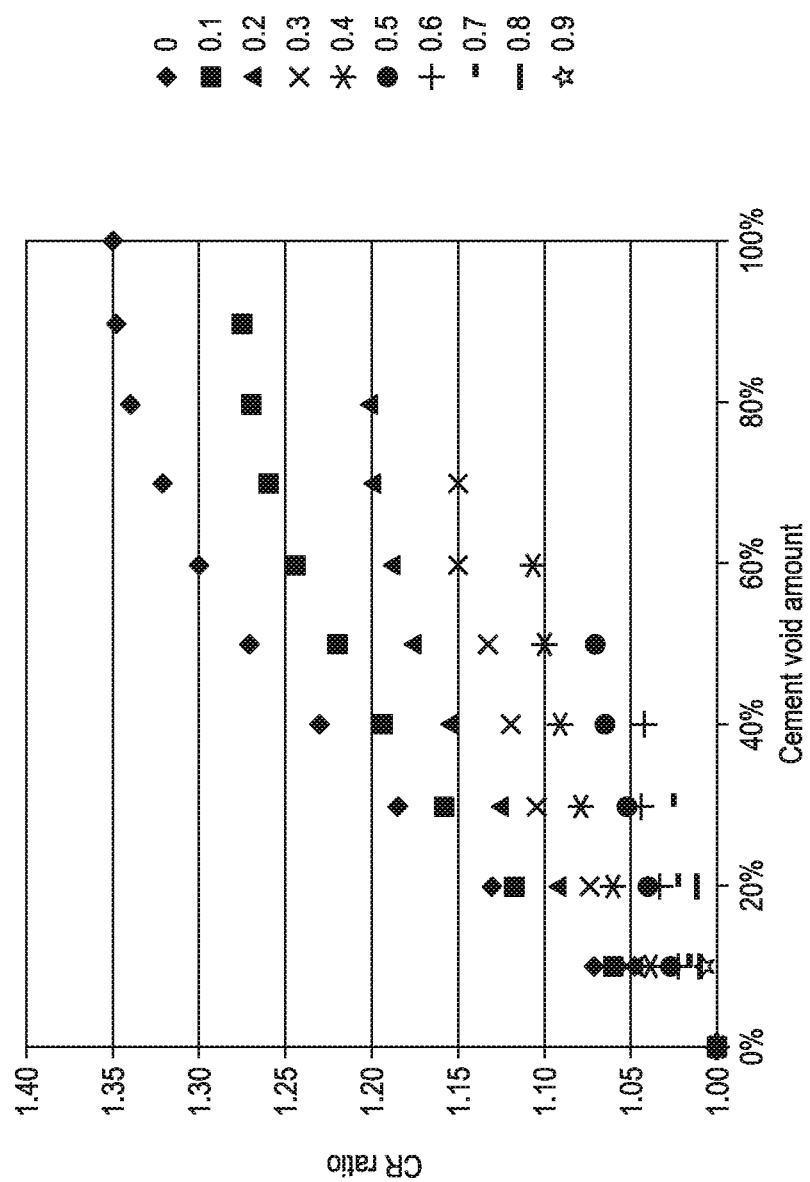
FIG. 5 is a plot of the count rate ratios ratio for a full set of basis structures of different cement integrities.

The dependence of count rate ratio and dipping point on the volume and the position of the void for a particular wellbore completion profile can be found by generating the spectra from a series of cement structure with different integrities using either computer simulated structures with simulated measurements or physically built structures with in-lab measurements. The structures are considered as the basis structures, which consist of different amount of void (from 10% up to 90% of the annular space) at different position inside the annular space. The position was labeled as 0, 0.1, 0.2, 0.3, 0.4, 0.5, 0.6, 0.7, 0.8, 0.9, 1. Position 0 is defined as the inner surface of the void coincides with the outer surface of the casing, and position 1 is defined as the inner surface of the void coincides with the outer surface of the annular space. Expanding on the example illustrated in FIGS. 2-3, the Monte-Carlo N-particle simulation was used to simulate the spectra for all basis structures. For the same wellbore completion profile (i.e., the same configuration of the pipe, cement, and wellbore) as FIG. 2, the dipping points from all basis structures are plotted in FIG. 4, and the count rate ratio from all basis structures are plotted in FIG. 5. Although 10% is chosen as the incremental amount for the basis structures of void amount, any number between 0% and 100% can be used when generating a series of structures of different void amounts. Similarly, although 0.1 is chosen as the incremental amount for the basic structure of void position, any number between 0 and 1 can be used when generating a series of structures of different void position.

Both the volume and the position of the void affects the count rates in the intermediate energy range. More specifically, count rates increase in the intermediate-energy range as the volume of the void increases and the void is closer to the tool (i.e., closer to the pipe). Therefore, a small void volume at a position close to the pipe could have the same count rate ratio as a large void volume at position farther away from the pipe.

Figure 6:
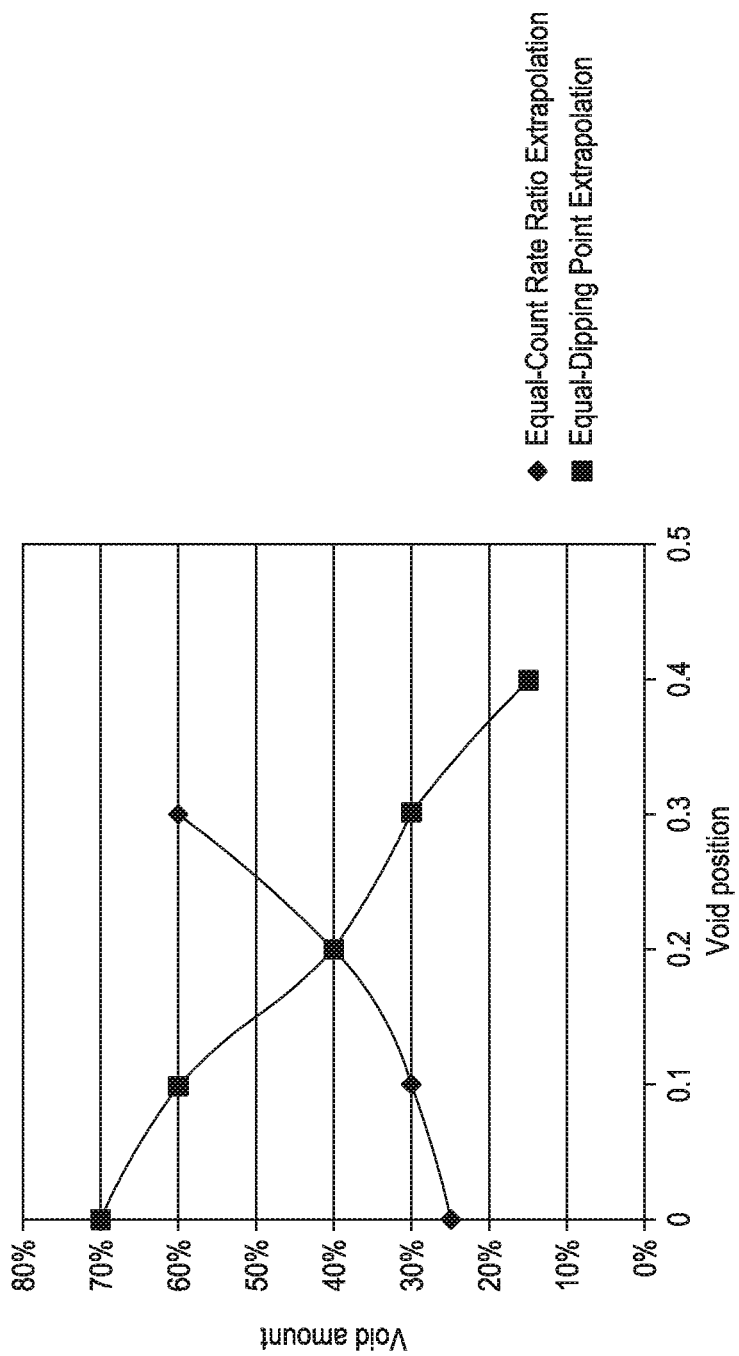
FIG. 6 is a void volume versus position plot with a monotonically increasing extrapolation from the count rate ratio and a monotonically decreasing extrapolation from the dipping point.

Therefore, the count rate ration and the dipping point may be correlated, for example, to produce a count rate ration/dipping point correlation that may be used to determine the volume and position of the void in the cement. For example, for a given count rate ratio value, an equal-rate ratio curve can be extrapolated (e.g., as a monotonically increasing curve) within a void volume vs. position plot, as illustrated in FIG. 6.

Further, the energy of the dipping point decreases as the volume of the void increases and the void is farther from the pipe. Therefore, a large cement void volume at void position close to the pipe could have the same dipping point value as that of a small cement void volume at a farther distance from the pipe. For a given dipping point value, an equal-dipping point curve can be extrapolated (e.g., as a monotonically decreasing curve) within a void volume vs. position plot, as illustrated in FIG. 6.

Generally, the method described herein include obtaining a, control spectrum for a given well completion profile by lab measurement, computer simulation, or a downhole measurement in good bonding section. Then, the measured sample spectrum from a cement structure with the void is compared to the control spectrum to determine a count rate ratio and dipping point value. Finally, the volume and the position of the void within the cement can be determined from a FIG. 6 plot where the equal-dipping point extrapolation and the equal-count rate ratio extrapolations are obtained from FIGS. 4-5. In FIG. 6, the intersection of the equal-count rate ratio and equal-dipping point extrapolations gives rise to the void position and void volume inside the cement.

Other physical characteristics of defects in the cement including, but not limited to those described herein, may be derived from a comparison of the sample spectrum and the control spectrum.

In some embodiments, a control system may include a set of instructions on a processor that cause a processor and/or system coupled thereto to perform the analyses, correlations, and methods described herein. In some instances, the control system (e.g., control system 124) may be a singular component of a system. In some instances, the control system (e.g., control system 124) may include several processors communicably coupled but not necessarily in a singular component. For example, data may be collected and stored on a first processor in the nuclear tool, and a second processor located outside the wellbore may be coupled to the first processor where the second processor performs analyses described herein on the data.

The processor may be a portion of computer hardware used to implement the various illustrative blocks, modules, elements, components, methods, and algorithms described herein. The processor may be configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMs, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to the processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments described herein include, but are not limited to, Embodiment A, Embodiment B, Embodiment C, and Embodiment D.

Embodiment A is a method comprising: providing a wellbore penetrating a subterranean formation, the wellbore being lined with a pipe and having a cement between the pipe and the wellbore, wherein the cement contains a defect; providing a control spectrum of gamma radiation count rates as a function of energy for a control, wherein the control comprises the cement without the defect; emitting gamma rays into the pipe and the cement having the defect from a source of a nuclear tool disposed in the wellbore; detecting count rates of gamma radiation scattered back from the pipe and the cement having the defect with a detector of the nuclear tool as a function of energy to produce a sample spectrum; and deriving one or more physical attributes related to the defect based on a comparison of the sample spectrum and the control spectrum.

Embodiment B is a system comprising: a conveyance extending into a wellbore penetrating a subterranean formation and coupled to a nuclear tool having at least one source and at least one detector, wherein the wellbore is lined with pipe and having a cement between the pipe and the wellbore, wherein the cement contains a defect; and a control system that includes a non-transitory medium readable by a processor and storing instructions for execution by the processor for the system to perform a method of Embodiment A.

Embodiments A and B may optionally include one or more of the following: Element 1: wherein the defect is a void, wherein the one or more physical attributes comprise a position of the void and a volume of the void, and wherein deriving the one or more physical attributes comprises: determining a high-energy range and an intermediate-energy range for the gamma radiation; calculating a count rate ratio ($CR_{ratio}$) of the count rates of the sample spectrum ($CR_{sam}$) relative to the count rates for the control spectrum ($CR_{con}$) over the intermediate-energy range (IER) according to $$CR_{ratio} = \frac{CR_{sam}}{CR_{con}}\bigg|_{IER};$$

identifying a dipping point as an energy value corresponding to a shape change in the sample spectrum relative to the control spectrum in the high-energy range for the sample spectrum; correlating the $CR_{ratio}$ and the dipping point using a known dependence of the $CR_{ratio}$ and dipping point relative to the position of the void and the volume of the void, thereby producing a $CR_{ratio}$/dipping point correlation; and determining the volume and the position of the void in the cement based on the $CR_{ratio}$/dipping point correlation; Element 2: Element 1 and wherein correlating the $CR_{ratio}$ and the dipping point involves plotting a monotonically increasing extrapolation from the $CR_{ratio}$ and a monotonically decreasing extrapolation from the dipping point on a void volume versus position plot using the known dependence of the $CR_{ratio}$ and dipping point on cement integrity for a given well completion profile; and wherein determining the volume and the position of the void is based on an intersection of the monotonically increasing extrapolation from the $CR_{ratio}$ and the monotonically decreasing extrapolation from the dipping point; Element 3: Element 1 and the method further comprising: establishing the known dependence of the $CR_{ratio}$ and dipping point on the cement integrity for the given well completion profile by computing the $CR_{ratio}$ and the dipping point for a plurality of spectra having the given well completion profile with differing volumes and positions of cement voids; Element 4: Element 3 and the method further comprising: measuring the plurality of spectra using a plurality of physically built structures; Element 5: Element 3 and the method further comprising: measuring the plurality of spectra using a plurality of computer simulated structures; Element 6: Element 1 and wherein identifying the dipping point of the spectrum uses a first derivative of the ratio of the control spectrum and the sample spectrum; Element 7: Element 1 and wherein identifying the dipping point of the spectrum uses a first derivative of a difference of the control spectrum minus the sample spectrum; and Element 8: wherein the defect is a void in the cement and the one or more physical attributes comprises a percent filling of the void with a liquid. Exemplary combinations may include, but are not limited to: Element 1 and 2 in combination with Element 6 and/or 7; Element 1 and 3 in combination with Element 6 and/or 7 and optionally Element 4 or 5; and Element 1 in combination with Element 8.

Embodiment C is a method comprising: emitting gamma from a source of a nuclear tool disposed in a wellbore to a pipe lining the wellbore and a cement between the pipe and the wellbore, wherein the cement contains a void; detecting count rates of gamma radiation scattered back from the pipe and the cement having the void with a detector of the nuclear tool as a function of energy to produce a sample spectrum; and deriving two or more physical attributes related to the defect based on a comparison of the sample spectrum and a control spectrum, wherein the control spectrum is gamma radiation count rates as a function of energy for a control that comprises the cement without the void, wherein the control comprises the cement without the void, and wherein the two or more physical attributes comprise one or more selected from the group consisting of a position of the void and a volume of the void.

Embodiment D is a system comprising: a conveyance extending into a wellbore penetrating a subterranean formation and coupled to a nuclear tool having at least one source and at least one detector, wherein the wellbore is lined with pipe and having a cement between the pipe and the wellbore, wherein the cement contains a defect; and a control system that includes a non-transitory medium readable by a processor and storing instructions for execution by the processor for the system to perform a method of Embodiment C.

Embodiments C and D may optionally include one or more of the following: Element 9: wherein the two or more physical attributes comprise the position of the void and the volume of the void, and wherein deriving the two or more physical attributes comprises: determining a high-energy range and an intermediate-energy range for the gamma radiation; calculating a count rate ratio ($CR_{ratio}$) of the count rates of the sample spectrum ($CR_{sam}$) relative to the count rates for the control spectrum ($CR_{con}$) over the intermediate-energy range (IER) according to $$CR_{ratio} = \frac{CR_{sam}}{CR_{con}}\bigg|_{IER};$$

identifying a dipping point as an energy value corresponding to a shape change in the sample spectrum relative to the control spectrum in the high-energy range for the sample spectrum; correlating the $CR_{ratio}$ and the dipping point using a known dependence of the $CR_{ratio}$ and dipping point relative to the position of the void and the volume of the void, thereby producing a $CR_{ratio}$/dipping point correlation; and determining the volume and the position of the void in the cement based on the $CR_{ratio}$/dipping point correlation;

Element 10: Element 9 and wherein correlating the $CR_{ratio}$ and the dipping point involves plotting a monotonically increasing extrapolation from the $CR_{ratio}$ and a monotonically decreasing extrapolation from the dipping point on a void volume versus position plot using the known dependence of the $CR_{ratio}$ and dipping point on cement integrity for a given well completion profile; and wherein determining the volume and the position of the void is based on an intersection of the monotonically increasing extrapolation from the $CR_{ratio}$ and the monotonically decreasing extrapolation from the dipping point;

Element 11: Element 9 and the method further comprising: establishing the known dependence of the $CR_{ratio}$ and dipping point on the cement integrity for the given well completion profile by computing the $CR_{ratio}$ and the dipping point for a plurality of spectra having the given well completion profile with differing volumes and positions of cement voids;

Element 12: Element 11 and further comprising: measuring the plurality of spectra using a plurality of physically built structures;

Element 13: Element 11 and further comprising: measuring the plurality of spectra using a plurality of computer simulated structures. Exemplary combinations may include, but are not limited to; Elements 9 and 10 in combination; and Elements 9 and 11 in combination with Element 12 and/or element 13.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    disposing a nuclear tool into a wellbore penetrating a subterranean formation, the wellbore being lined with a pipe and having a cement between the pipe and the wellbore, wherein the cement contains a defect;
    providing a control spectrum of gamma radiation count rates as a function of energy for a control, wherein the control comprises the cement without the defect;
    emitting gamma rays into the pipe and the cement having the defect from a source on the nuclear tool disposed in the wellbore;
    detecting count rates of gamma radiation scattered back from the pipe and the cement having the defect with a detector of the nuclear tool as a function of energy to produce a sample spectrum;
    deriving one or more physical attributes related to the defect based on a comparison of the sample spectrum and the control spectrum, wherein deriving the one or more physical attributes comprises calculating a count rate ratio (CRratio) of the count rates of the normalized sample spectrum (CRsam) relative to the count rates for the normalized control spectrum (CRcon) over an intermediate-energy range (IER) according to:

$$CR_{ratio} = \frac{CR_{Sam}}{CR_{con}}\bigg|_{IER};$$

and
    identifying a dipping point as an energy value corresponding to a shape change in the sample spectrum relative to the control spectrum in a high-energy range for the sample spectrum.

2. The method of claim 1, wherein the defect is a void, wherein the one or more physical attributes comprise a position of the void and a volume of the void, and wherein deriving the one or more physical attributes further comprises:
    determining the IER for the gamma radiation;
    correlating the CRratio and the dipping point using a known dependence of the CRratio and dipping point relative to the position of the void and the volume of the void, thereby producing a CRratio/dipping point correlation; and
    determining the volume and the position of the void in the cement based on the CRratio/dipping point correlation.

3. The method of claim 2, wherein correlating the CRratio and the dipping point involves plotting a monotonically increasing extrapolation from the CRratio and a monotonically decreasing extrapolation from the dipping point on a void volume versus position plot using the known dependence of the CRratio and dipping point on cement integrity for a given well completion profile; and wherein determining the volume and the position of the void is based on an intersection of the monotonically increasing extrapolation from the CRratio and the monotonically decreasing extrapolation from the dipping point.

4. The method of claim 2 further comprising: establishing the known dependence of the CRratio and dipping point on the cement integrity for the given well completion profile by computing the CRratio and the dipping point for a plurality of spectra having the given well completion profile with differing volumes and positions of cement voids.

5. The method of claim 4 further comprising: measuring the plurality of spectra using a plurality of physically built structures.

6. The method of claim 4 further comprising: measuring the plurality of spectra using a plurality of computer simulated structures.

7. The method of claim 2, wherein identifying the dipping point of the spectrum uses a first derivative of the ratio of the control spectrum and the sample spectrum.

8. The method of claim 2, wherein identifying the dipping point of the spectrum uses a first derivative of a difference of the control spectrum minus the sample spectrum.

9. The method of claim 1, wherein the defect is a void in the cement and the one or more physical attributes comprises a percent filling of the void with a liquid.

10. A method comprising:
emitting gamma from a source of a nuclear tool disposed in a wellbore to a pipe lining the wellbore and a cement between the pipe and the wellbore, wherein the cement contains a void;
detecting count rates of gamma radiation scattered back from the pipe and the cement having the void with a detector of the nuclear tool as a function of energy to produce a sample spectrum;
deriving two or more physical attributes related to the defect based on a comparison of the sample spectrum and a control spectrum, wherein the control spectrum is gamma radiation count rates as a function of energy for a control that comprises the cement without the void, wherein the control comprises the cement without the void, and wherein the two or more physical attributes comprise one or more selected from the group consisting of a position of the void and a volume of the void, and wherein deriving the two or more physical attributes comprises calculating a count rate ratio (CRratio) of the count rates of the normalized sample spectrum (CRsam) relative to the count rates for the normalized control spectrum (CRcon) over an intermediate-energy range (IER) according to:

$$CR_{ratio} = \left. \frac{CR_{Sam}}{CR_{con}} \right|_{IER};$$

and
identifying a dipping point as an energy value corresponding to a shape change in the sample spectrum relative to the control spectrum in a high-energy range for the sample spectrum.

11. The method of claim 10, wherein the two or more physical attributes comprise the position of the void and the volume of the void, and wherein deriving the two or more physical attributes further comprises:
determining the IER for the gamma radiation;
correlating the CRratio and the dipping point using a known dependence of the CRratio and dipping point relative to the position of the void and the volume of the void, thereby producing a CRratio/dipping point correlation; and
determining the volume and the position of the void in the cement based on the CRratio/dipping point correlation.

12. The method of claim 11, wherein correlating the CRratio and the dipping point involves plotting a monotonically increasing extrapolation from the CRratio and a monotonically decreasing extrapolation from the dipping point on a void volume versus position plot using the known dependence of the CRratio and dipping point on cement integrity for a given well completion profile; and wherein determining the volume and the position of the void is based on an intersection of the monotonically increasing extrapolation from the CRratio and the monotonically decreasing extrapolation from the dipping point.

13. The method of claim 11 further comprising: establishing the known dependence of the CRratio and dipping point on the cement integrity for the given well completion profile by computing the CRratio and the dipping point for a plurality of spectra having the given well completion profile with differing volumes and positions of cement voids.

14. The method of claim 13 further comprising: measuring the plurality of spectra using a plurality of physically built structures.

15. The method of claim 13 further comprising: measuring the plurality of spectra using a plurality of computer simulated structures.

16. A system comprising:
a conveyance extending into a wellbore penetrating a subterranean formation and coupled to a nuclear tool having at least one source and at least one detector, wherein the wellbore is lined with pipe and having a cement between the pipe and the wellbore, wherein the cement contains a defect; and
a control system that includes a non-transitory medium readable by a processor and storing instructions for execution by the processor for the system to perform a method comprising:
emitting gamma rays into the pipe and the cement from said at least one source of said nuclear tool disposed in the wellbore;
detecting count rates of gamma radiation scattered back from the pipe and the cement having the defect with said at least one detector of the nuclear tool as a function of energy to produce a sample spectrum;
deriving one or more physical attributes related to the defect based on a comparison of the sample spectrum and a control spectrum, wherein deriving the one or more physical attributes comprises calculating a count rate ratio (CRratio) of the count rates of the sample spectrum (CRsam) relative to the count rates for the control spectrum (CRcon) over an intermediate-energy range (IER) according to:

$$CR_{ratio} = \left. \frac{CR_{Sam}}{CR_{con}} \right|_{IER};$$

and
identifying a dipping point as an energy value corresponding to a shape change in the sample spectrum relative to the control spectrum in a high-energy range for the sample spectrum.

17. The system of claim 16, wherein the defect is a void, wherein the one or more physical attributes comprise a position of the void and a volume of the void, and wherein deriving the one or more physical attributes further comprises:
   determining the IER for the gamma radiation;
   correlating the CRratio and the dipping point using a known dependence of the CRratio and dipping point relative to the position of the void and the volume of the void, thereby producing a CRratio/dipping point correlation; and
   determining the volume and the position of the void in the cement based on based on the CRratio/dipping point correlation.

18. The system of claim 17, wherein identifying the dipping point of the spectrum uses a first derivative of the ratio of the control spectrum and the sample spectrum.

19. The system of claim 17, wherein identifying the dipping point of the spectrum uses a first derivative of a difference of the control spectrum minus the sample spectrum.

20. The system of claim 16, wherein the defect is a void in the cement and the one or more physical attributes comprises a percent filling of the void with a liquid.

\* \* \* \* \*